United States Patent
Dateki et al.

(10) Patent No.: US 10,348,369 B2
(45) Date of Patent: Jul. 9, 2019

(54) TRANSMISSION CONTROL DEVICE AND TRANSMISSION CONTROL METHOD

(71) Applicant: FUJITSU LIMITED, Kawasaki-shi, Kanagawa (JP)

(72) Inventors: Takashi Dateki, Yokohama (JP); Takashi Seyama, Kawasaki (JP); Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 15/627,990

(22) Filed: Jun. 20, 2017

(65) Prior Publication Data

US 2018/0013470 A1 Jan. 11, 2018

(30) Foreign Application Priority Data

Jul. 5, 2016 (JP) .................................. 2016-133688

(51) Int. Cl.
| | |
|---|---|
| H04W 56/00 | (2009.01) |
| H04B 7/0452 | (2017.01) |
| H04W 76/15 | (2018.01) |
| H04B 7/024 | (2017.01) |
| H04B 17/318 | (2015.01) |

(Continued)

(52) U.S. Cl.
CPC .......... *H04B 7/024* (2013.01); *H04B 7/0452* (2013.01); *H04B 7/0634* (2013.01); *H04B 17/318* (2015.01); *H04L 5/001* (2013.01); *H04L 5/0035* (2013.01); *H04W 56/0005* (2013.01); *H04W 56/0045* (2013.01); *H04W 56/0055* (2013.01);

(Continued)

(58) Field of Classification Search
CPC . H04W 64/00; H04W 56/0005; H04W 24/10; H04W 56/0065; H04W 56/0055
See application file for complete search history.

(56) References Cited

U.S. PATENT DOCUMENTS

| | | | |
|---|---|---|---|
| 9,414,350 B1* | 8/2016 | Martin ................... | H04W 64/00 |
| 2011/0135300 A1* | 6/2011 | Oyane ................... | H04W 56/00 398/25 |

(Continued)

FOREIGN PATENT DOCUMENTS

| | | |
|---|---|---|
| JP | 2012-039400 | 2/2012 |
| JP | 2014-514841 | 6/2014 |

(Continued)

OTHER PUBLICATIONS

S. B. Gee, et al.,"Cooperative Multiuser MIMO Precoding Design for Asynchronous Interference Mitigation", 2011 IEEE GLOBECOM Workshops (GC wkshps), Dec. 5-9, 2011, pp. 486-490 (5 pages).

(Continued)

*Primary Examiner* — Raj Jain
(74) *Attorney, Agent, or Firm* — Fujitsu Patent Center

(57) ABSTRACT

A transmission control device includes an acquiring unit that acquires propagation delay time for each propagation path between a plurality of terminal devices and a plurality of transmitter stations; a selector that selects, based on the propagation delay time acquired by the acquiring unit, combinations of terminal devices having similar propagation delay differences from the plurality of the transmitter stations; and a controller that controls transmission timing of the plurality of the transmitter stations that transmit signals to the combinations of the terminal devices selected by the selector.

9 Claims, 13 Drawing Sheets

(51) Int. Cl.
    *H04B 7/06*     (2006.01)
    *H04L 5/00*     (2006.01)
    *H04W 72/04*     (2009.01)

(52) U.S. Cl.
    CPC ....... *H04W 72/0406* (2013.01); *H04W 76/15* (2018.02)

(56) References Cited

U.S. PATENT DOCUMENTS

| | | |
|---|---|---|
| 2012/0257569 A1 | 10/2012 | Jang et al. |
| 2013/0215848 A1 | 8/2013 | Kato et al. |
| 2013/0279457 A1 | 10/2013 | Takano |
| 2015/0003329 A1 | 1/2015 | Morita |
| 2015/0319785 A1 | 11/2015 | Kato et al. |
| 2016/0315673 A1 | 10/2016 | Morita |
| 2017/0079072 A1 | 3/2017 | Kato et al. |
| 2018/0013470 A1* | 1/2018 | Dateki .............. H04W 56/0005 |
| 2018/0042052 A1* | 2/2018 | Harjula ............. H04W 74/0833 |

FOREIGN PATENT DOCUMENTS

| | | |
|---|---|---|
| WO | 2012-108281 | 8/2012 |
| WO | 2012-138143 | 10/2012 |
| WO | 2013-108906 | 7/2013 |

OTHER PUBLICATIONS

Seyama, et al., "A Basic Study on Joint Transmission MU-MIMO in 5G Ultra High-Density Distributed Antenna System", IEICE Communications Society Conference 2015, p. 326, Aug. 25, 2015 (3 pages).

\* cited by examiner

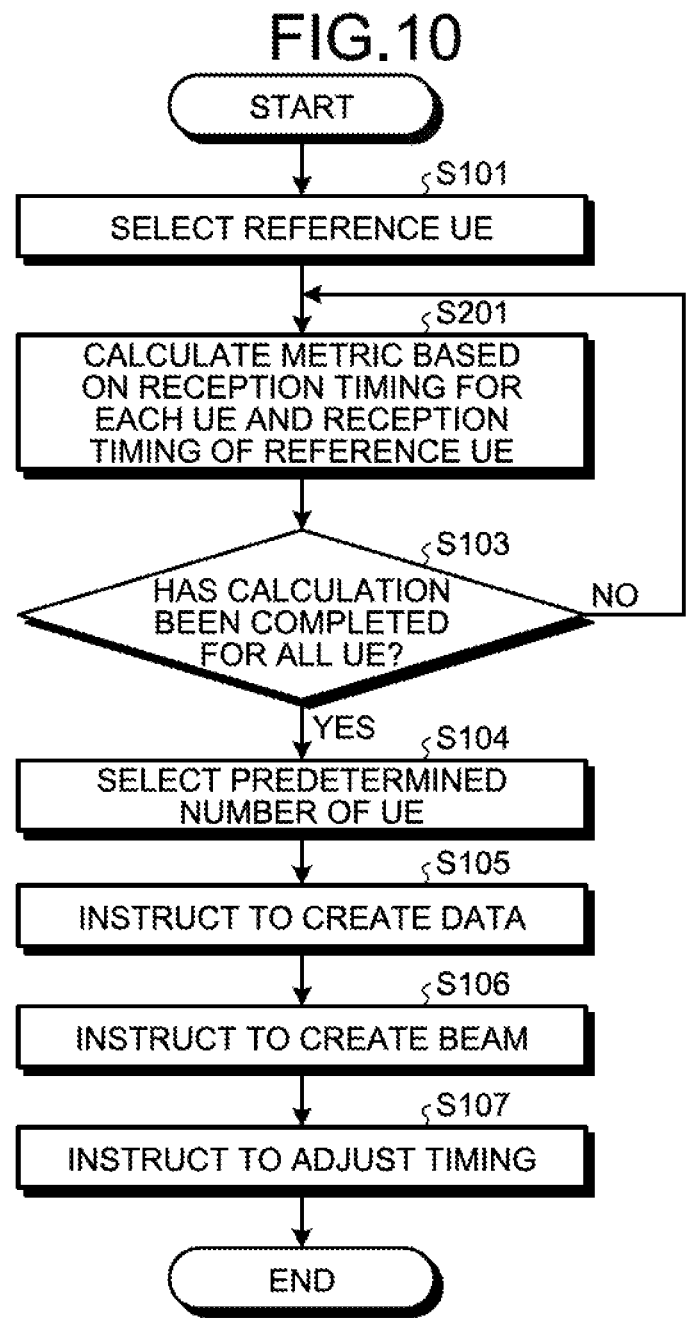

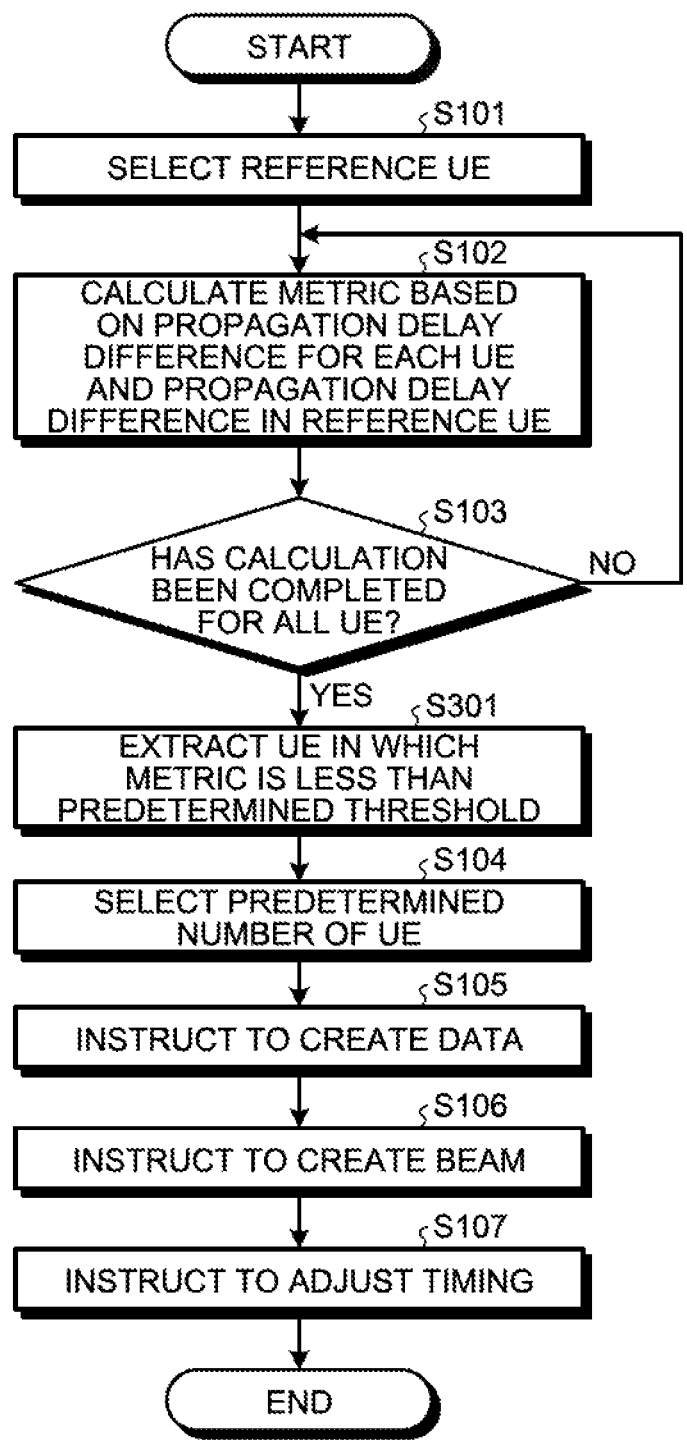

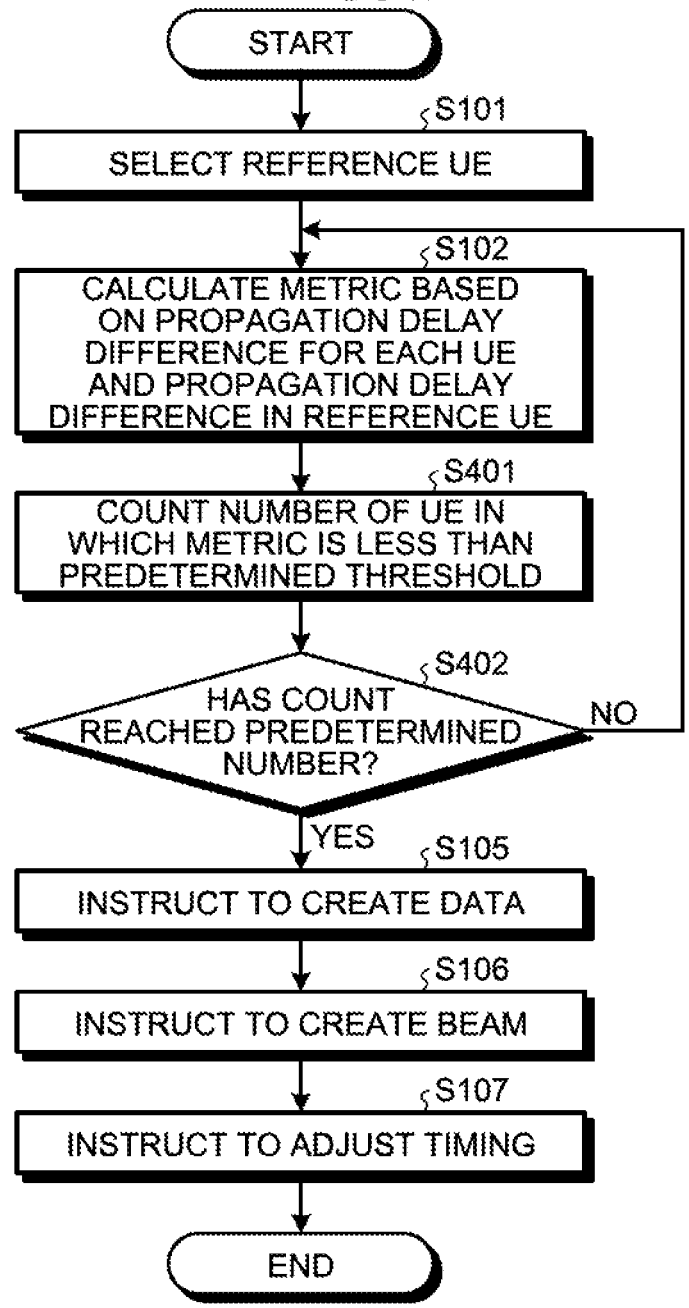

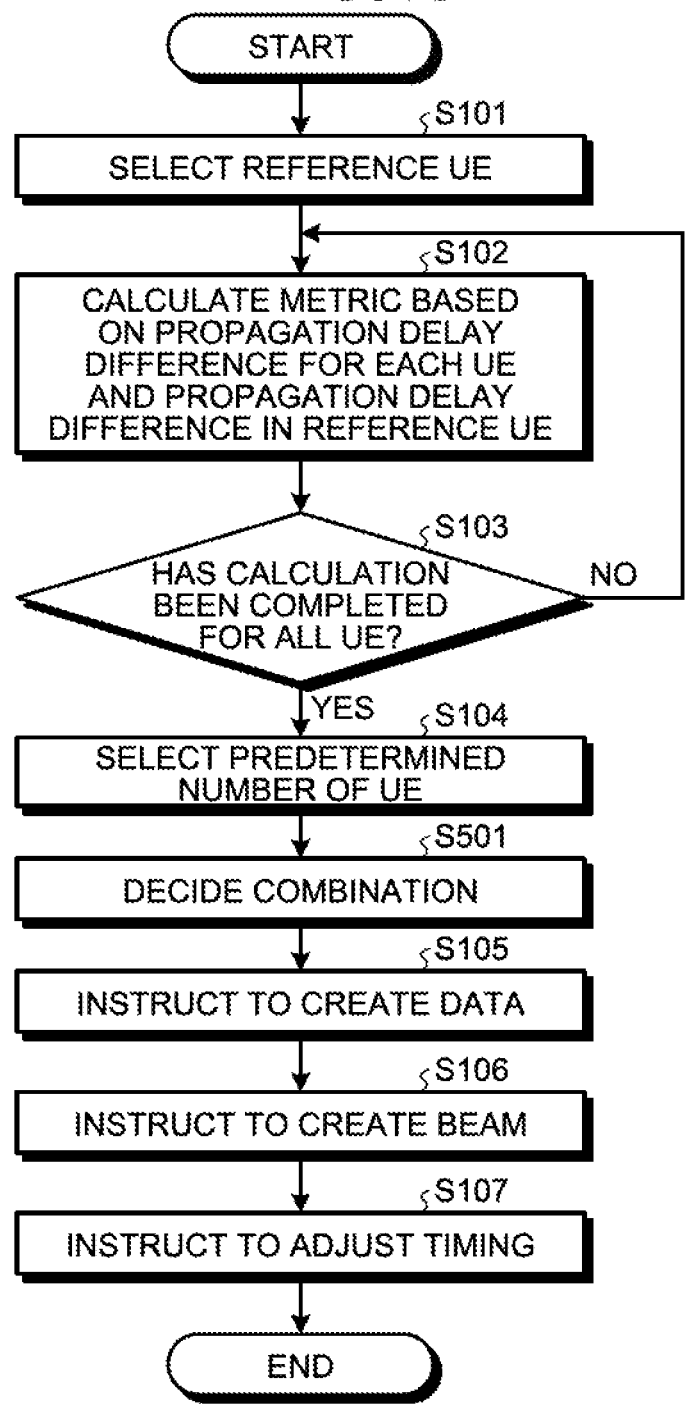

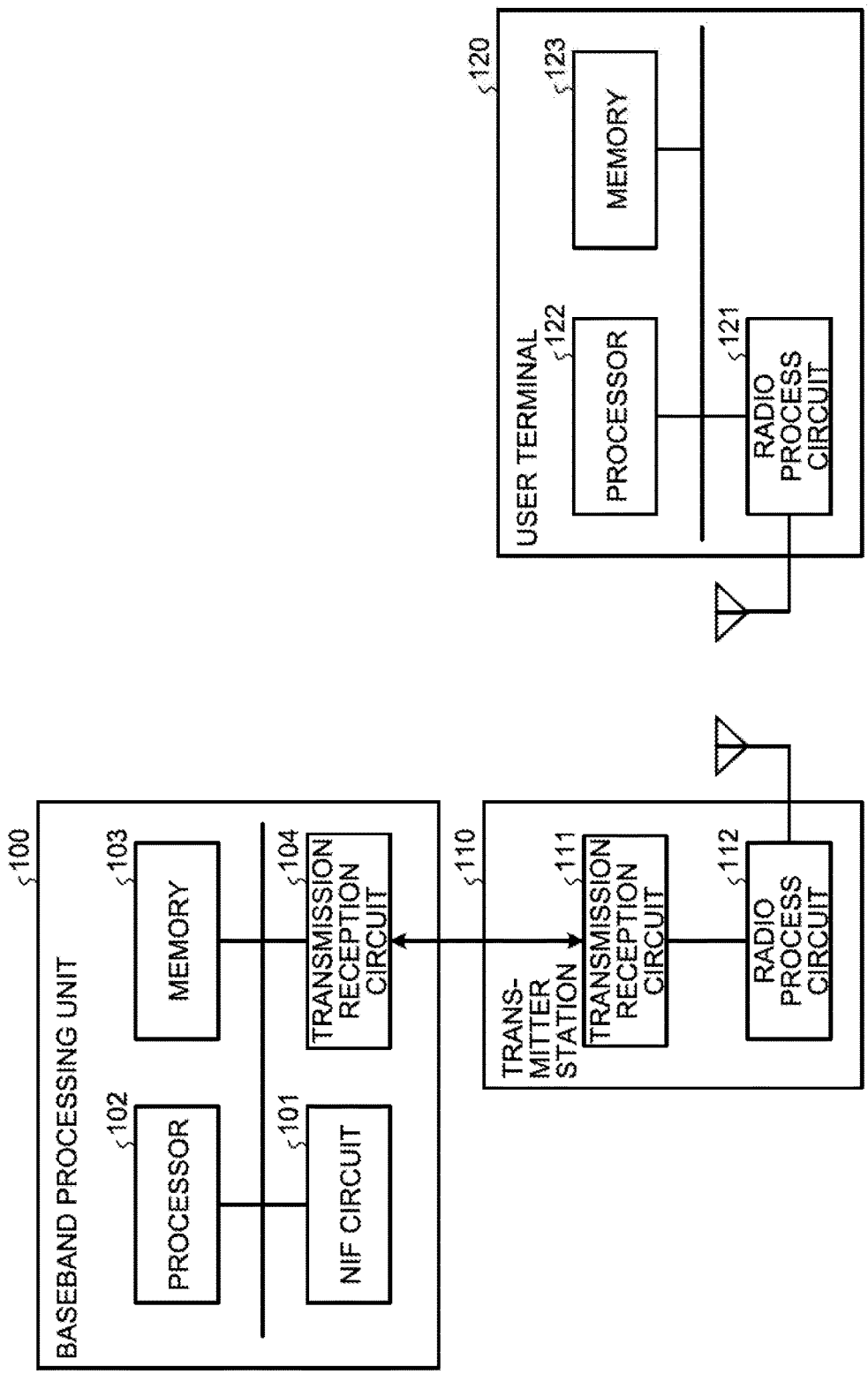

TRANSMISSION CONTROL DEVICE AND TRANSMISSION CONTROL METHOD

CROSS-REFERENCE TO RELATED APPLICATION

This application is based upon and claims the benefit of priority of the prior Japanese Patent Application No. 2016-133688, filed on Jul. 5, 2016, the entire contents of which are incorporated herein by reference.

FIELD

The embodiments discussed herein are related to a transmission control device and a transmission control method.

BACKGROUND

In recent years, multi user multi input multi output (MIMO) technology that simultaneously transmits data from a base station provided with a plurality of transmission antennas to a plurality of user terminals has been drawing attention. In multi user MIMO (hereinafter, simply referred to as "MU-MIMO"), countermeasure, such as Zero Forcing (ZF), block diagonalization, or the like, that multiplies a transmission weight by a transmission signal in order to prevent interference between data addressed to a plurality of user terminals, is sometimes used. The transmission weight is a weight that adjusts the phase and the amplitude of the transmission signal and, by deciding the transmission weight in accordance with the channels between base stations and user terminals, interference can be reduced by making the transmission signals addressed to the plurality of the user terminals orthogonal.

In contrast, coordinated multi-point transmission and reception (CoMP) in which a plurality of cells sends and receives signals to and from a single user terminal in a cooperation manner is also actively studied. Furthermore, in order to increase the capacity of the radio communication system, it is conceivable that a plurality of transmitter stations that performs CoMP simultaneously transmits signals to a plurality of user terminals by using MU-MIMO.

In this radio communication system, because the propagation distance between each of the transmitter stations and the user terminals is different, a propagation delay difference is generated. For example, if, at the same time when a signal is transmitted from a certain transmitter station to a user terminal, a signal is transmitted from another transmitter station to the same user terminal, the signal transmitted from the transmitter station whose distance from the user terminal is greater is received later. Thus, if the reception phase of the signal transmitted from a first transmitter station is used as the reference, the reception phase of the signal transmitted from a second transmitter station rotates in a frequency domain. Namely, the signals transmitted from the two transmitter stations are received by the phase differences that are different for each frequency and, depending on the frequencies, the reception signals received from the two transmitter stations interfere with each other. Thus, studies have been conducted on a method of deciding an optimum transmission weight or the like based on the assumption that interference is additionally generated due to an influence of a propagation delay difference.

Patent Document 1: Japanese Laid-open Patent Publication No. 2012-39400
Patent Document 2: International Publication Pamphlet No. WO 2013/108906
Patent Document 3: Japanese National Publication of International Patent Application No. 2014-514841
Patent Document 4: International Publication Pamphlet No. WO 2012/108281
Non-Patent Document 1: S. B. Gee, Z. Lei, and Y. H. Chew, "Cooperative Multiuser MIMO Precoding Design for Asynchronous Interference Mitigation", 2011 IEEE GLOBECOM Workshops (GC wkshps), Dec. 5-9, 2011
Non-Patent Document 2: Takashi Seyama, et al. "A Basic Study on Joint Transmission MU-MIMO in 5G Ultra High-Density Distributed Antenna System" Proceedings of the 2015 the Institute of Electronics, Information and Communication Engineers (IEICE) Society Conference, communication (1), 326, Aug. 25, 2015

As described above, if there is a difference between the propagation delay time between the transmitter stations and the user terminals, the phase difference of the reception signal from each of the transmitter stations differs for each frequency in the user terminals. Thus, the optimum value of the transmission weight that adjusts the phase and the amplitude of the transmission signal is different for each frequency. Thus, if a propagation delay difference is present, it is difficult to sufficiently reduce interference even if the transmission weight is decided by taking into consideration the influence of the propagation delay difference. Namely, even if the transmission weight is decided by taking into consideration the influence of the propagation delay difference, if this transmission weight is uniformly multiplied by the transmission signal in the whole band, the interference of only a part of frequency component is merely reduced.

Thus, because the optimum transmission weight differs in accordance with the frequency, it is conceivable that the band of the transmission signal is divided and an optimum transmission weight is calculated for each of the frequency sections. However, in order to sufficiently reduce the interference, because the transmission signal is divided into a large number of narrow band frequency sections and the transmission weight is calculated for each frequency section, there is a problem in that an amount of process is increased. In other words, by calculating a transmission weight with a high frequency resolution, the amount of process is increased in proportion to the frequency resolution.

SUMMARY

According to an aspect of an embodiment, a transmission control device includes: an acquiring unit that acquires propagation delay time for each propagation path between a plurality of terminal devices and a plurality of transmitter stations; a selector that selects, based on the propagation delay time acquired by the acquiring unit, combinations of terminal devices having similar propagation delay differences from the plurality of the transmitter stations; and a controller that controls transmission timing of the plurality of the transmitter stations that transmit signals to the combinations of the terminal devices selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a flowchart illustrating a transmission control method according to the second embodiment;

FIG. 11 is a flowchart illustrating a transmission control method according to a third embodiment;

FIG. 12 is a flowchart illustrating a transmission control method according to a fourth embodiment;

FIG. 13 is a flowchart illustrating a transmission control method according to a fifth embodiment; and FIG. 14 is a block diagram illustrating an example of the hardware configuration of the radio communication system.

DESCRIPTION OF EMBODIMENTS

Preferred embodiments of the present invention will be explained with reference to accompanying drawings. The present invention is not limited to the embodiments.

[a] First Embodiment

Figure 1:
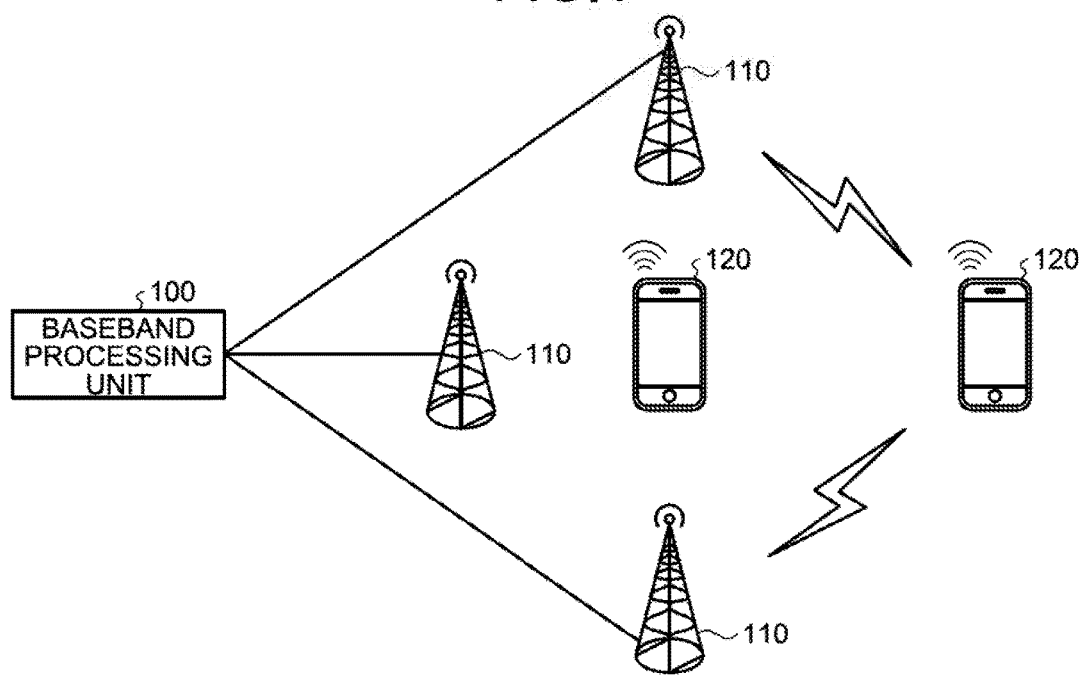
FIG. 1 is a schematic diagram illustrating the configuration of a radio communication system according to a first embodiment.

FIG. 1 is a schematic diagram illustrating the configuration of a radio communication system according to a first embodiment. The radio communication system illustrated in FIG. 1 includes a baseband processing unit 100, a plurality of transmitter stations 110, and a plurality of user terminals 120.

The baseband processing unit 100 performs a baseband process on a signal. Specifically, the baseband processing unit 100 creates user data addressed to each of the user terminals 120, performs a transmission process on the user data, and outputs the user data to each of the transmitter stations 110. At this time, the baseband processing unit 100 performs scheduling that decides combinations of the user terminals 120 that simultaneously serve as the transmission destination of the user data and then creates signals addressed to these combinations of the user terminals 120. Then, the baseband processing unit 100 adjusts the transmission timing of the signal addressed to each of the user terminals 120 and outputs the user data to the plurality of the transmitter stations 110. Furthermore, the baseband processing unit 100 receives, from each of the transmitter stations 110, the signal transmitted by each of the user terminals 120. Furthermore, the baseband processing unit 100 will be described in detail later.

The transmitter stations 110 are connected to the baseband processing unit 100 via, for example, optical fibers, receive the signals output from the baseband processing unit 100, and perform radio transmission on the user terminals 120. At this time, the transmitter stations 110 perform a radio transmission process, such as Digital/Analog (D/A) conversion, up-conversion, or the like, on the signals addressed to the user terminals 120 and transmit the obtained radio signals via the antenna. Furthermore, the transmitter stations 110 receive the signal transmitted by each of the user terminals 120, perform a radio reception process, such as down-conversion, Analog/Digital (A/D) conversion, or the like, and output the obtained baseband signal to the baseband processing unit 100.

Furthermore, the transmitter stations 110 perform MU-MIMO that simultaneously transmits signals to the plurality of the user terminals 120. Furthermore, the plurality of the transmitter stations 110 performs, in cooperation with each other, CoMP that simultaneously transmits a signal to the single user terminal 120. However, because each of the transmitter stations 110 transmits the signal at the transmission timing adjusted by the baseband processing unit 100, the timing in which each of the transmitter stations 110 transmits the signal addressed to the same user terminal 120 does not need to completely match.

The user terminals 120 receive the signals transmitted from the plurality of the transmitter stations 110. the user data addressed to the own terminal is included in the reception signal received by each of the user terminals 120 and the interference due to the user data addressed to the other user terminal 120 that becomes the transmission destination at the same time as the own terminal has been sufficiently reduced as the result of scheduling performed by the baseband processing unit 100. Furthermore, the user terminal 120 transmits a signal to the transmitter station 110 that transmits the signal to the own terminal. In the uplink signal transmitted by each of the user terminals 120, channel state information or the like that indicates, for example, ACK/NACK indicating success or failure of the reception of the downlink signal, a channel state of the downlink, or the like is included.

Figure 2:
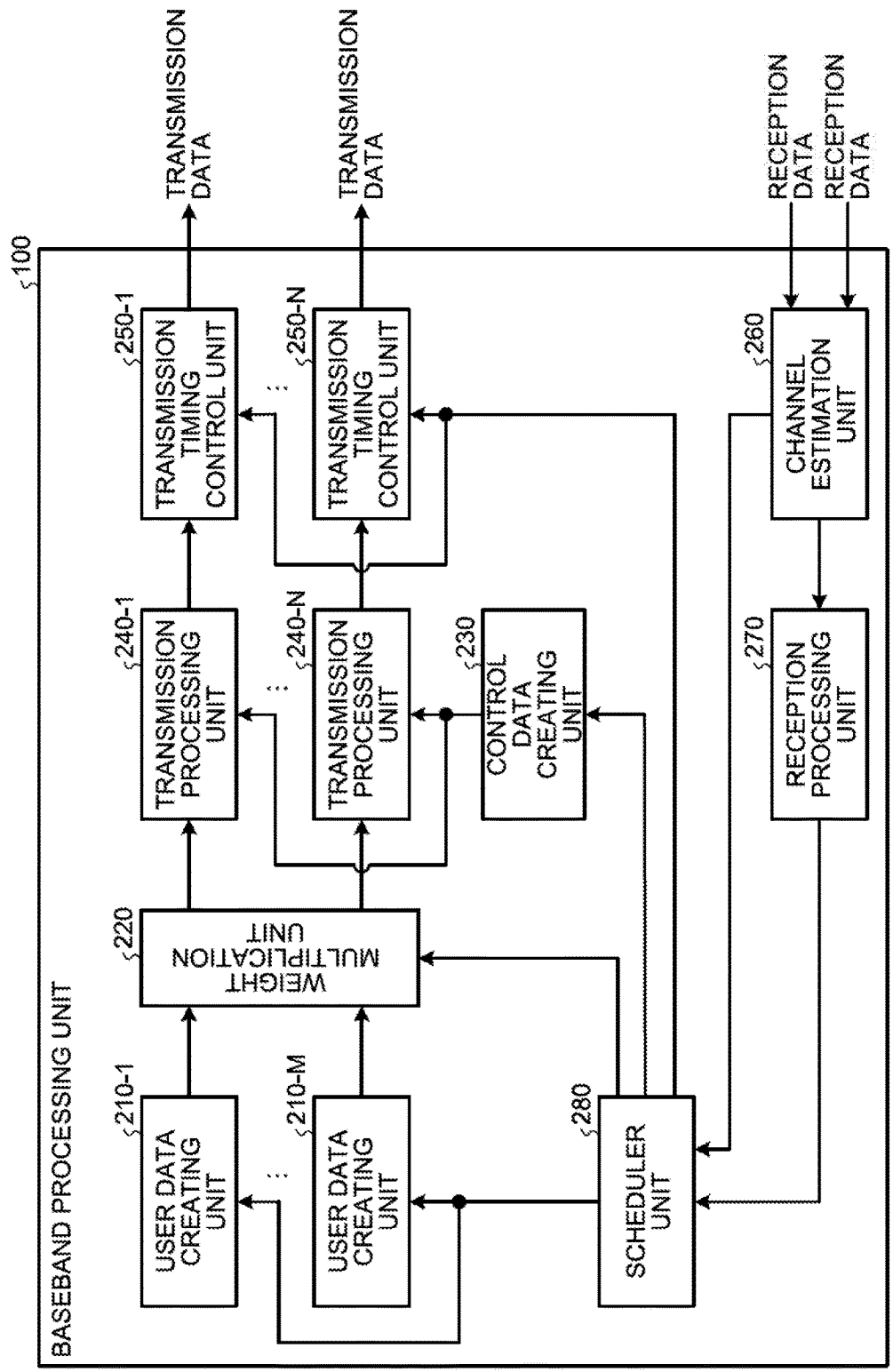
FIG. 2 is a block diagram illustrating the configuration of a baseband processing unit according to the first embodiment.

FIG. 2 is a block diagram illustrating the configuration of the baseband processing unit 100 according to the first embodiment. The baseband processing unit 100 illustrated in FIG. 2 includes user data creating units 210-1 to 210-M (M is an integer equal to or greater than two), a weight multiplication unit 220, a control data creating unit 230, transmission processing units 240-1 to 240-N (N is an integer equal to or greater than two), transmission timing control units 250-1 to 250-N, a channel estimation unit 260, a reception processing unit 270, and a scheduler unit 280.

Figure 3:
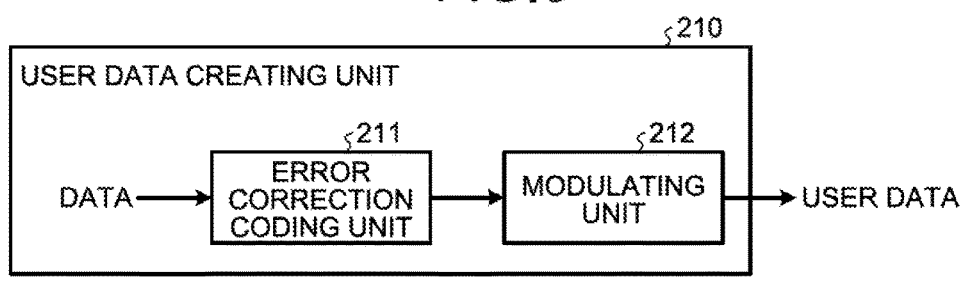
FIG. 3 is a block diagram illustrating the configuration of a user data creating unit.

The user data creating units 210-1 to 210-M create the user data addressed to different user terminals 120 in accordance with the instruction from the scheduler unit 280. Namely, the user data creating units 210-1 to 210-M create a maximum of M pieces of user data addressed to the user terminals 120 that are simultaneously decided to be the transmission destination by the scheduler unit 280. Namely, each of the user data creating units 210-1 to 210-M includes, for example, as illustrated in FIG. 3, an error correction coding unit 211 and a modulating unit 212.

The error correction coding unit 211 performs error correction coding on individual data addressed to the user terminals 120 and outputs the obtained encoding data to the modulating unit 212.

The modulating unit 212 modulates the encoding data output from the error correction coding unit 211 and outputs the obtained user data to the weight multiplication unit 220.

The encoding rate in the error correction coding unit 211 and the modulation technique used in the modulating unit 212 are instructed by the scheduler unit 280. Namely, the modulation and coding scheme (MCS) used for the user data is indicated by the scheduler unit 280.

A description will be given here by referring back to FIG. 2. The weight multiplication unit 220 multiplies the transmission weight by a maximum of M pieces of user data addressed to the user terminals 120 created by the user data creating units 210-1 to 210-M. Specifically, the weight multiplication unit 220 acquires the weight information associated with the beam decided by the scheduler unit 280 and multiplies, in accordance with the acquired weight information, the transmission weight by the user data addressed to each of the user terminals 120.

The transmission weight multiplied by the weight multiplication unit 220 may also be different for each frequency. Namely, the whole band of the user data may also be divided and a different transmission weight may also be multiplied for each frequency section. However, as will be described later, in the embodiment, because the scheduler unit 280 decides combinations of user terminals 120 having almost similar propagation delay difference and the user data is simultaneously transmitted to the subject combinations of the user terminals 120, the frequency resolution may also be low. In other words, because the user terminals 120 having almost similar propagation delay difference are selected and the transmission timing of each of the transmitter stations 110 with respect to the selected user terminals 120 is adjusted in accordance with the propagation delay differences, the actual propagation delay difference in each of the user terminals 120 commonly becomes small. Consequently, the variation in the phase relationship for each frequency due to the propagation delay difference is small and, if a common transmission weight is multiplied to relatively wide-band user data, it is possible to improve the degradation of the characteristic.

The control data creating unit 230 creates control data addressed to the user terminal 120 in accordance with an instruction from the scheduler unit 280. Namely, the control data creating unit 230 creates the control data that includes therein information on the result of scheduling obtained by the scheduler unit 280, the MCS, or the like.

Figure 4:
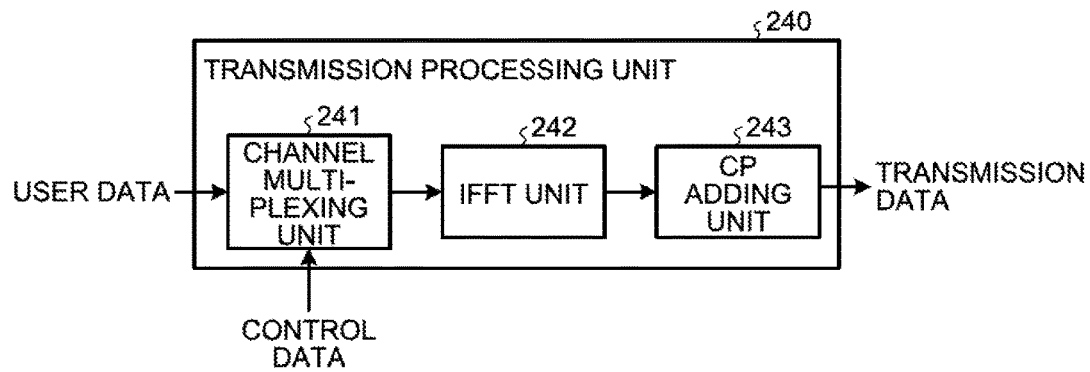
FIG. 4 is a block diagram illustrating the configuration of a transmission processing unit.

The transmission processing units 240-1 to 240-N create different transmission data to be output to each of the transmitter stations 110. Namely, the transmission processing units 240-1 to 240-N create a maximum of N pieces of transmission data transmitted from the transmitter stations 110 that simultaneously transmit the signals in corporation with each other. Specifically, each of the transmission processing units 240-1 to 240-N includes, for example, as illustrated in FIG. 4, a channel multiplexing unit 241, an inverse fast Fourier transform (IFFT) unit 242, and a cyclic prefix (CP) adding unit 243.

The channel multiplexing unit 241 multiplexes the user data and the control data for each of the user terminals 120 and outputs the obtained multiplex data to the IFFT unit 242.

The IFFT unit 242 performs inverse fast Fourier transform on the multiplex data output from the channel multiplexing unit 241 and creates an effective symbol in which multiplex data is multiplexed onto each of plurality of subcarriers having different frequencies.

The CP adding unit 243 adds, as a CP, the end portion of the effective symbol output from the IFFT unit 242 to the top of the effective symbol and creates an OFDM symbol. The OFDM symbol obtained by the CP adding unit 243 adding the CP becomes the transmission data that is transmitted from each of the transmitter stations 110.

A description will be given here by referring back to FIG. 2. The transmission timing control units 250-1 to 250-N adjust, in accordance with an instruction from the scheduler unit 280, the transmission timing in which a signal is transmitted from each of the transmitter stations 110. Namely, by controlling the timing in which each of the pieces of the transmission data is output to the transmitter station 110, each of the transmission timing control units 250-1 to 250-N allows the signals to be transmitted from the transmitter stations 110 at different transmission timing. The transmission timing control units 250-1 to 250-N control the transmission timing of each of the transmitter stations 110, whereby, in the user terminals 120, the propagation delay differences of the signals from the different transmitter stations 110 become small. In other words, even if signals are transmitted from the plurality of the transmitter stations 110 each having a different propagation distance, the timing in which these signals are received by the respective user terminals 120 becomes closer.

The channel estimation unit 260 acquires the reception data that is received and output by each of the transmitter stations 110 from the user terminals 120 and then performs channel estimation between the user terminals 120 and the transmitter stations 110. Specifically, by using the reference signal, such as the sounding reference signal (SRS), the demodulation reference signal (DRS), or the like, that is included in the reception data, the channel estimation unit 260 performs channel estimation on the uplink channel from the user terminals 120 toward the transmitter stations 110.

Furthermore, by using the reference signal, such as the SRS, the DRS, or the like, the channel estimation unit 260 detects the reception timing, in the transmitter station 110, of the signals transmitted from the user terminals 120. At this point, the channel estimation unit 260 detects the reception timing for each combination of the user terminals 120 and the transmitter stations 110. The reception timing detected by the channel estimation unit 260 corresponds to the propagation delay time between the user terminals 120 and the transmitter stations 110. Namely, for example, if the propagation distance between the user terminal 120 and the transmitter station 110 is large and the propagation delay time is large, regarding the subject combination of the user terminal 120 and the transmitter station 110, late reception timing is detected. The channel estimation unit 260 notifies the scheduler unit 280 of the reception timing for each combination of the user terminal 120 and the transmitter station 110.

The reception processing unit 270 demodulates the reception data by using the result of the channel estimation performed by the channel estimation unit 260 and acquires ACK/NACK and channel state information that are included in the reception data. Then, the reception processing unit 270 outputs ACK/NACK and the channel state information to the scheduler unit 280.

The scheduler unit 280 performs scheduling that decides the user terminals 120 that simultaneously become the transmission destination of the user data based on the reception timing and the channel state information related to each of the user terminals 120. Namely, the scheduler unit 280 decides the plurality of the user terminals 120 that simultaneously become the transmission destination of the user data and then decides the beam and the transmission timing in each of the transmitter stations 110 at the time when the signals are simultaneously transmitted to these user terminals 120.

Figure 5:
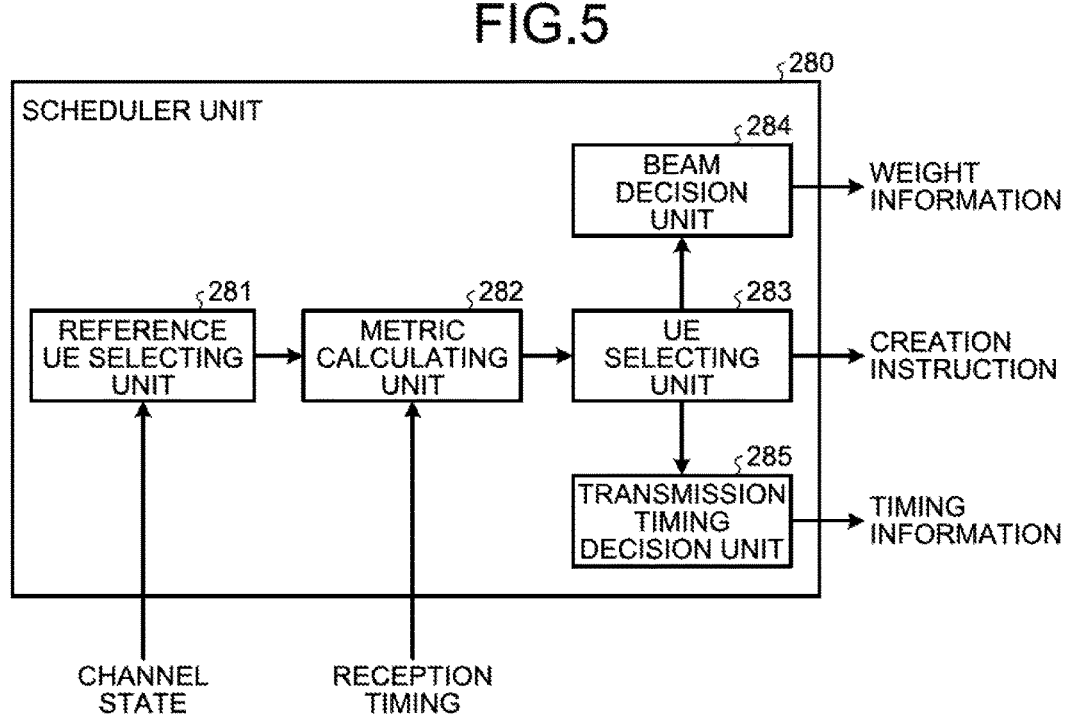
FIG. 5 is a block diagram illustrating the configuration of a scheduler unit.

Specifically, the scheduler unit 280 includes, as illustrated in FIG. 5, a reference user equipment (UE) selecting unit 281, a metric calculating unit 282, a UE selecting unit 283, a beam decision unit 284, and a transmission timing decision unit 285.

The reference UE selecting unit 281 selects the single user terminal 120 (hereinafter, referred to as a "reference UE") that is used for the reference and that serves as the transmission destination of the user data. At this time, the reference UE selecting unit 281 may also obtain, for example, Proportional Fair (PF) metric from the channel state information output from the reception processing unit 270 and may also select the user terminal 120 having the maximum PF metric as the reference UE. Furthermore, the reference UE selecting unit 281 may also sequentially select the reference UE by using, for example, a round robin method. Furthermore, the reference UE selecting unit 281 may also select, with priority as the reference UE, the user terminal 120 that requests retransmission based on, for example, ACK/NACK output from the reception processing unit 270.

The metric calculating unit 282 calculates, based on the reception timing of the signal received from the reference UE and based on the reception timing of the signal received from the other user terminal 120, a metric that is used to select the user terminal 120 that simultaneously serves as the transmission destination of the user data together with the reference UE. Specifically, the metric calculating unit 282 calculates the metric that is used to select the user terminal 120 in which the propagation delay difference from each of the transmitter stations 110 is closer to the propagation delay difference from each of the transmitter stations 110 to the reference UE. Accordingly, the metric calculating unit 282 calculates a metric of Metric(k) related to each of the user terminals 120 by using, for example, Equation (1) below.

$$\text{Metric }(k) = \sum_n |(T(n,k) - T(l,k)) - (T(n,l) - T(l,l))| \quad (1)$$

In Equation (1) above, T (a,b) represents the reception timing in a transmitter station (TP#a) of the signal that is transmitted from a user terminal (UE#b). Thus, Equation (1) indicates that the sum of differences between, based on a transmitter station (TP#1), the propagation delay difference from each of transmitter stations (TP#n) to a user terminal (UE#k) and the propagation delay difference from each of the transmitter stations (TP#n) to the reference UE (UE#1) is set to the metric of Metric(k) of the user terminal (UE#k). As the metric of the user terminal 120 is smaller, this indicates that the propagation delay difference from the plurality of the transmitter stations 110 to the subject user terminal 120 is similar to the propagation delay difference from the plurality of the transmitter stations 110 to the reference UE.

The UE selecting unit 283 selects, based on the metric calculated by the metric calculating unit 282, the user terminals 120 that simultaneously serves as the transmission destination of the user data together with the reference UE. Namely, the UE selecting unit 283 selects combinations of the plurality of the user terminals 120 that simultaneously serve as the transmission destination of the user data together with the reference UE. At this time, the UE selecting unit 283 sequentially selects a predetermined number of the user terminals 120 in the order in which the user terminal 120 has a small metric calculated by the metric calculating unit 282. For example, the maximum number of multiplexed MU-MIMO can be used for the number of the user terminals 120 selected by the UE selecting unit 283. Then, the UE selecting unit 283 decides to simultaneously transmit the user data to the selected user terminals 120 and the reference UE and instructs the user data creating units 210-1 to 210-M and the control data creating unit 230 to create the user data and the control data addressed to these user terminals 120.

In the following, the user terminals 120 selected by the UE selecting unit 283 will be described with reference to FIG. 6.

Figure 6:
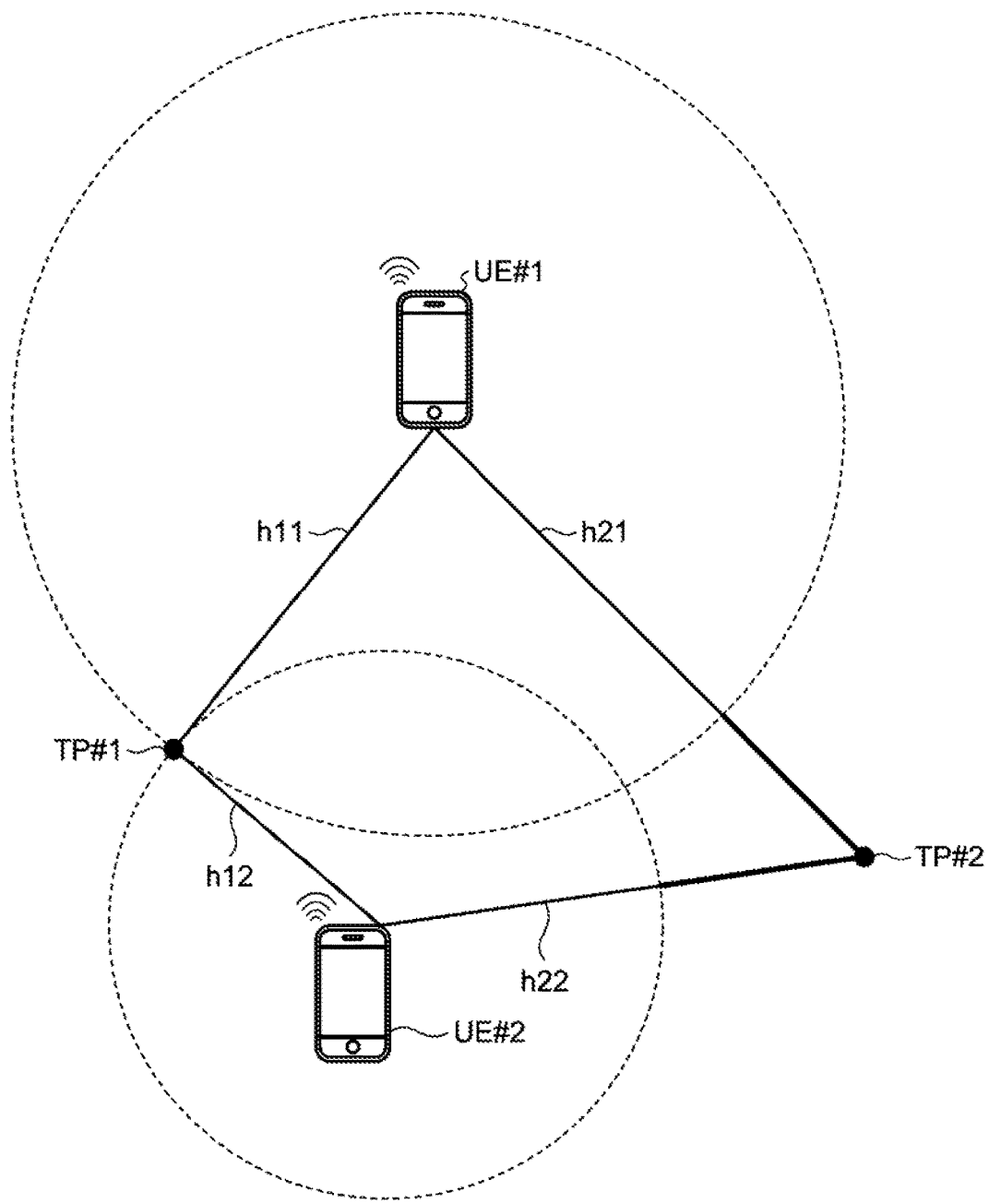
FIG. 6 is a schematic diagram illustrating the selection of UE according to the first embodiment.

As illustrated in FIG. 6, it is assumed that the transmitter station (TP#1) and a transmitter station (TP#2) are arranged in the radio communication system and these transmitter stations perform radio communication with a user terminal (UE#1) and a user terminal (UE#2). At this time, because a propagation path h21 between the transmitter station (TP#2) and the user terminal (UE#1) is longer than a propagation path h11 between the transmitter station (TP#1) and the user terminal (UE#1), in the user terminal (UE#1), the propagation delay time of the signal from the transmitter station (TP#2) is longer. Furthermore, the propagation delay difference from each of the transmitter stations to the user terminal (UE#1) is the time corresponding to the difference between h21 and h11 indicated by the thick lines illustrated in FIG. 6.

Similarly, because a propagation path h22 between the transmitter station (TP#2) and the user terminal (UE#2) is longer than a propagation path h12 between the transmitter station (TP#1) and the user terminal (UE#2), in the user terminal (UE#2), the propagation delay time of the signal from the transmitter station (TP#2) is longer. Then, the propagation delay difference from each of the transmitter stations to the user terminal (UE#2) is the time corresponding to the difference between h22 and h12 indicated by the thick lines illustrated in FIG. 6.

Here, if the user terminal (UE#1) is the reference UE and if the propagation delay difference from each of the transmitter stations related to the reference UE (in this case, corresponding to the portion of the thick line indicated by h21) is about the same as the propagation delay difference from each of the transmitter stations related to the user terminal (UE#2) (in this case, corresponding to a portion of the thick line indicated by h22), the UE selecting unit 283 selects the user terminal (UE#2). In this way, because the UE selecting unit 283 selects the combination of the user terminals 120 having the similar propagation delay differences from each of the transmitter stations, by adjusting the transmission timing from the transmitter station 110 in accordance with the propagation delay difference, the signal from each of the transmitter stations 110 is almost simultaneously received by each of the user terminals 120.

Namely, in the example illustrated in FIG. 6, by making the transmission timing of the transmitter station (TP#2) delay by an amount corresponding to the propagation delay difference associated with the thick line, the signals transmitted from the transmitter station (TP#1) and the transmitter station (TP#2) are almost simultaneously received by both the user terminal (UE#1) and the user terminal (UE#2) and thus it is possible to commonly reduce the actual propagation delay difference.

A description will be given here by referring back to FIG. 5. The beam decision unit 284 decides the beam that is used to simultaneously transmit the signal to the combination of the user terminals 120 selected by the UE selecting unit 283 and obtains the transmission weight that is used to form the subject beam. Namely, the beam decision unit 284 estimates the direction of each of the user terminals 120 selected by the UE selecting unit 283 based on, for example, the arrival direction estimation of the signal and decides the beam with a large gain in the direction of these user terminals 120.

Then, the beam decision unit 284 calculates the transmission weight that is used to form the decided beam for each of the user terminals 120. At this time, the beam decision unit 284 may also calculate the transmission weight for each frequency of the user data. However, because the combinations of the user terminals 120 having the similar propagation delay differences are selected by the UE selecting unit 283, the beam decision unit 284 only calculates the transmission weight at relatively low frequency resolution. The beam decision unit 284 outputs the weight information indicating the calculated transmission weight to the weight multiplication unit 220.

In order to simultaneously transmit the signals to the combinations of the user terminals 120 selected by the UE selecting unit 283, the transmission timing decision unit 285 decides each of the transmission timing of the transmitter stations 110 that transmit the signals to these user terminals 120. Namely, the transmission timing decision unit 285 adjusts, regarding each of the transmitter stations 110, the transmission timing by an amount corresponding to the propagation delay difference of the propagation to the user terminal 120 and then decides the transmission timing of each of the transmitter stations 110 such that the signals are almost simultaneously received by the user terminals 120. The transmission timing decision unit 285 outputs the timing information indicating the decided transmission timing to the transmission timing control units 250-1 to 250-N associated with the respective transmitter stations 110.

Figure 7:
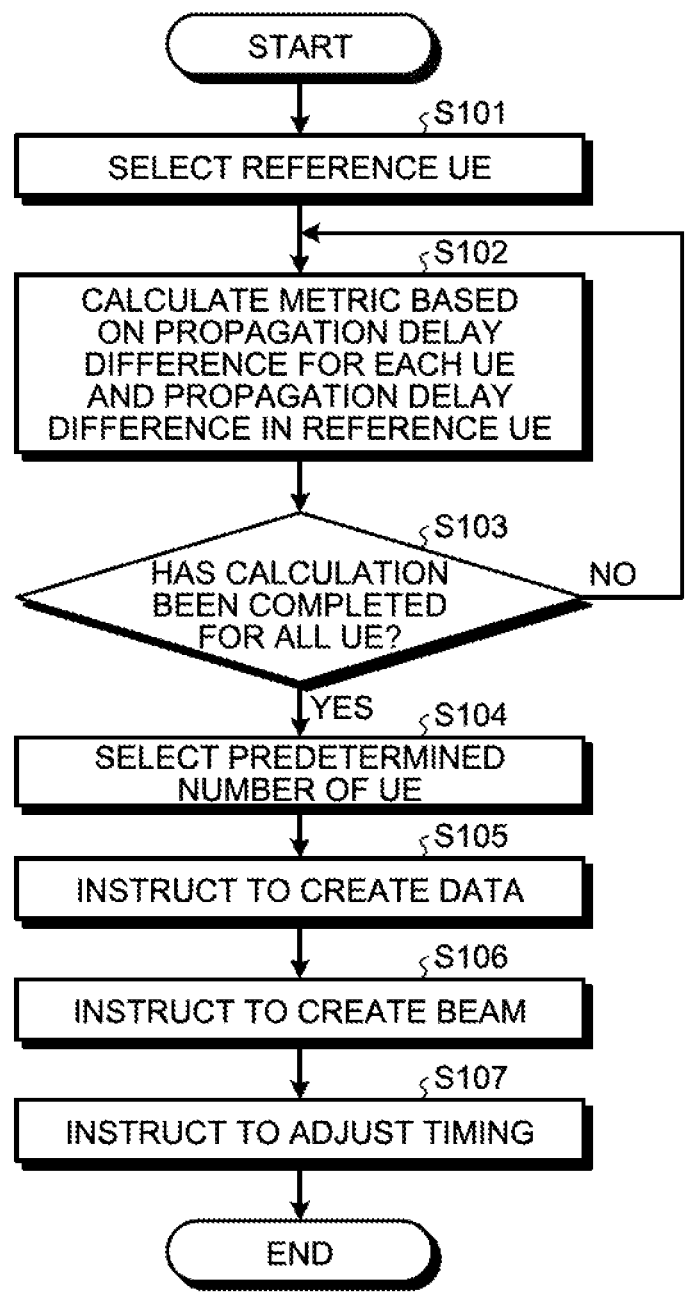
FIG. 7 is a flowchart illustrating a transmission control method according to the first embodiment.

In the following, a transmission control method performed by the baseband processing unit 100 having the configuration described above will be described with reference to the flowchart illustrated in FIG. 7.

The transmitter station 110 connected to the baseband processing unit 100 receives the signal transmitted from the user terminal 120 that is the counterpart of the radio communication and outputs the reception data to the baseband processing unit 100. This reception data is input to the channel estimation unit 260 and, by using the reference signal, such as SRS, DRS, or the like, included in the reception data, the reception timing corresponding to the propagation delay time between each of the user terminals 120 and the transmitter station 110 is detected. The detected reception timing is notified to the scheduler unit 280.

Furthermore, because the reception data is demodulated by the reception processing unit 270, the channel state information on the downlink reported by the user terminal 120 is acquired. The channel state information is output to the scheduler unit 280.

Then, because the channel state information is used by the reference UE selecting unit 281 in the scheduler unit 280, the reference UE is selected (Step S101). Namely, for example, the PF metric is obtained for each of the user terminals 120 from the downlink channel state for each of the combinations of the transmitter stations 110 and the user terminals 120 and then the user terminal 120 having the maximum PF metric is selected as the reference UE. By selecting the reference UE by using the PF metric, the user data is fairly transmitted to each of the user terminals 120.

Furthermore, when the reference UE is selected, the reference UE may also be sequentially selected by using, for example, a round robin method or, alternatively, the user terminal 120 that requests retransmission may also be used, with priority based on ACK/NACK, as the reference UE.

If the reference UE is selected, the metric that is based on the propagation delay difference in each of the user terminals 120 from the plurality of the transmitter stations 110 and that is based on the propagation delay difference in the reference UE from the plurality of the transmitter stations 110 are calculated by the metric calculating unit 282 (Step S102). Namely, the metric that is used to determine, for each of the user terminals 120, whether the propagation delay differences from the plurality of the transmitter stations 110 are similar to that of the reference UE is calculated.

Specifically, the reception timing in the transmitter station 110 of the signal transmitted from the user terminal 120 corresponds to the propagation delay time from the transmitter station 110 to the user terminal 120 due to the symmetry of the uplink and the downlink propagation paths. Thus, by using the reception timing detected by the channel estimation unit 260, the metric indicated by Equation (1) above is calculated for each of the user terminals 120. If the metric is calculated for the single user terminal 120, it is determined, by the metric calculating unit 282, whether the calculation of the metric has been completed in all of the user terminals 120 (Step S103). If the result of this determination indicates that there is the user terminal 120 in which the metric has not been calculated (No at Step S103), the calculation of the metric is repeated.

Then, if the calculation of the metric has been completed for all of the user terminals 120 (Yes at Step S103), the predetermined number of the user terminals 120 having a smaller metric are selected by the UE selecting unit 283 (Step S104). Regarding the metric indicated by Equation (1) above, for each of the user terminals 120, because the value is smaller as the propagation delay difference is similar to that of the reference UE, by selecting the user terminal 120 having a small metric, the user terminal 120 having a similar propagation delay difference as that of the reference UE is selected.

Then, an instruction to create the user data to be addressed to the selected user terminals 120 and the reference UE is output from the UE selecting unit 283 to the user data creating units 210-1 to 210-M (Step S105). Similarly, an instruction to create the control data to be addressed to the selected user terminal 120 and the reference UE is output from the UE selecting unit 283 to the control data creating unit 230.

Furthermore, the beam with a large gain in the direction of the combination of the user terminals 120 selected by the UE selecting unit 283 is decided by the beam decision unit 284 and the transmission weight that is used to form the decided beam is calculated. The weight information indicating the calculated transmission weight is output to the weight multiplication unit 220 and an instruction to create the beam is output (Step S106). Then, the transmission weight is multiplied, by the weight multiplication unit 220, by each of the pieces of the user data created by the user data creating units 210-1 to 210-M and then the transmission process is performed on user data by the transmission processing units 240-1 to 240-N in each of the transmitter stations 110.

Furthermore, the transmission timing of each of the transmitter stations 110 is decided by the transmission timing decision unit 285 in order to simultaneously transmit the signal to the combinations of the user terminals 120 selected by the UE selecting unit 283. The timing information indicating the decided transmission timing is output to the transmission timing control units 250-1 to 250-N and an instruction to adjust the timing of transmission from each of the transmitter stations 110 is output (Step S107). In response to this instruction, the transmission timing of the transmission data that has been subjected to the transmission process is controlled by the transmission timing control units 250-1 to 250-N and is output to each of the transmitter stations 110.

The transmission data output in this way is wirelessly transmitted at the adjusted transmission timing from each of the transmitter stations 110 and is received by each of the user terminals 120. At this time, because the transmission timing for each of the transmitter stations 110 has been adjusted, in each of the user terminals 120, the pieces of the transmission data from the plurality of the transmitter stations 110 are almost simultaneously received.

Furthermore, in the embodiment, the user data to be addressed to the user terminals 120 having the similar propagation delay differences is also simultaneously transmitted from each of the transmitter stations 110. However, in the embodiment, because the user terminals 120 having the similar propagation delay differences are simultaneously selected as the transmission destination, interference due to the user data to be addressed to the other user terminal 120 is sufficiently reduced by the phase adjustment using the transmission weight. Namely, because the user terminals 120 having the similar propagation delay differences are simultaneously selected as the transmission destination, by adjusting the transmission timing in accordance with the similar propagation delay differences, the actual propagation delay difference in each of the user terminals 120 can commonly be decreased. Consequently, the variation in reception phase differences in the frequency domain due to the propagation delay differences is small and, even if a common transmission weight is multiplied to a portion of relatively wide band, such as the whole band of, for example, the user data, the interference due to the user data addressed to the other user terminals 120 is sufficiently reduced.

Figure 8:
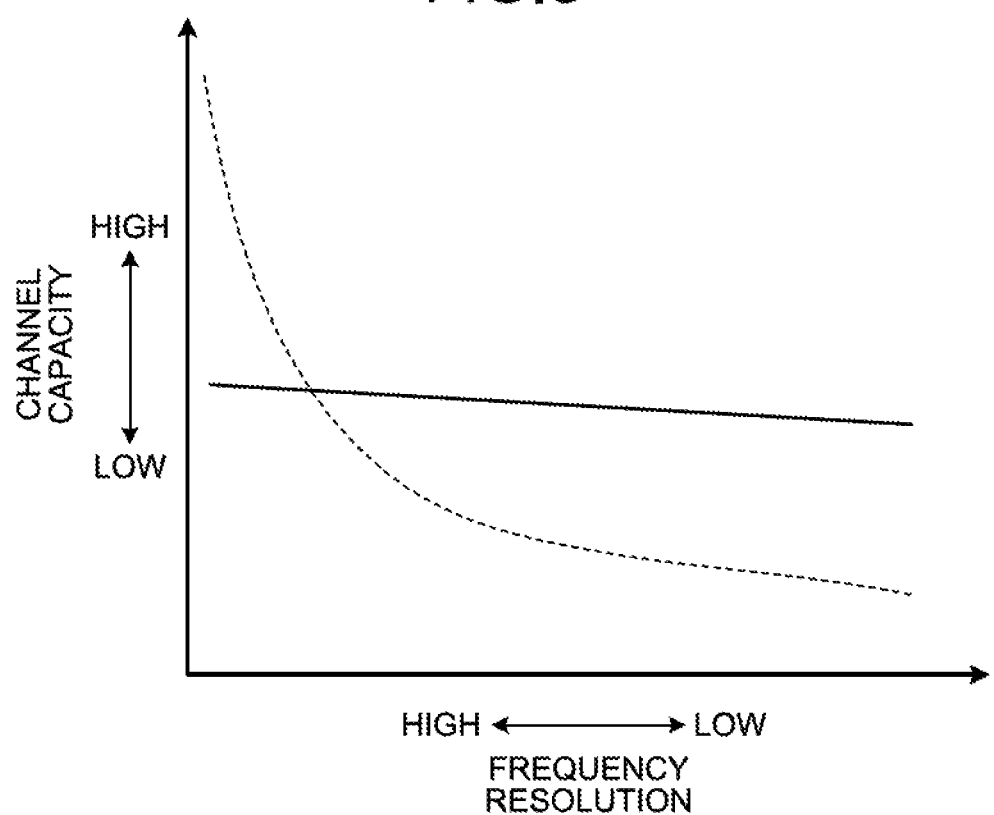
FIG. 8 is a schematic diagram illustrating the relationship between the frequency resolution and the channel capacity.

In other words, for example, as indicated by the solid line illustrated in FIG. 8, if the user data is simultaneously transmitted to the user terminals 120 having the similar propagation delay differences, even when decreasing the frequency resolution at the time when the transmission weight is multiplied, a decrease in channel capacity indicating the communication efficiency is small. In contrast, for example, as indicated by the broken line illustrated in FIG. 8, if the user data is simultaneously transmitted to the user terminals 120 having dissimilar propagation delay differences, although the channel capacity is enhanced if the frequency resolution is increased, if the frequency resolution is decreased, the channel capacity is significantly decreased. Thus, in order to implement desired channel capacity, as in the embodiment, if the user data is simultaneously transmitted to the user terminals 120 having similar propagation delay differences, this makes it possible to suppress an increase in the processing amount by only calculating a transmission weight with a low frequency resolution.

As described above, according to the embodiment, by using the metric focusing on the propagation delay difference in each of the user terminals from the plurality of transmitter stations, the combinations of the user terminals having the same degree of propagation delay differences are selected. Then, the signals are allowed to transmit from the plurality of the transmitter stations after adjusting the transmission timing of the selected combinations of the user terminals. Thus, by adjusting the transmission timing, it is possible to commonly reduce the actual propagation delay differences in all of the selected user terminals and it is possible to reduce the variation in the reception phase differences in the frequency domain due to the propagation delay differences. Consequently, the interference between the user terminals can be reduced even if a transmission weight is created at low frequency resolution and it is possible to efficiently reduce the interference by suppressing an increase in the processing amount.

[b] Second Embodiment

The characteristic of a second embodiment is that the combinations of the user terminals having similar propagation delay difference are selected by using the metric focusing on a difference between the propagation delay time from the same transmitter station to each of the user terminals.

The configuration of a radio communication system according to the second embodiment is the same as that described in the first embodiment (FIG. 1), therefore, descriptions thereof will be omitted. Furthermore, The configuration of the baseband processing unit 100 according to the second embodiment is the same as that described in the first embodiment (FIG. 2); therefore, descriptions thereof will be omitted. In the second embodiment, the metric calculated by the metric calculating unit 282 in the scheduler unit 280 is different from that described in the first embodiment.

In the second embodiment, the metric calculating unit 282 calculates the metric that is used to select the user terminal 120 in which the propagation delay time from each of the transmitter stations 110 is substantially the same as that from the subject transmitter station 110 to the reference UE. Thus, the metric calculating unit 282 calculates the metric of Metric(k) related to each of the user terminals 120 by using, for example, Equation (2) below.

$$\text{Metric}(k) = \sum_n |T(n, k) - T(n, l)| \qquad (2)$$

In Equation (2) above, T(a,b) represents the reception timing, in the transmitter station (TP#a), of the signal transmitted from the user terminal (UE#b). Thus, Equation (2) indicates that the sum of the difference between the propagation delay time from each of the transmitter stations (TP#n) to the user terminal (UE#k) and the propagation delay time from each of the transmitter stations (TP#n) to the reference UE (UE#1) is set to the metric of Metric(k) of the user terminal (UE#k). As the metric of the user terminal 120 is smaller, the propagation delay time from each of the transmitter stations 110 with respect to the subject user terminal 120 is similar to the propagation delay time with respect to the reference UE and, as a result, the propagation delay difference related to the subject user terminal 120 and the propagation delay difference related to the reference UE are similar.

In the following, the user terminal 120 that is selected by using the metric according to the second embodiment will be described with reference to FIG. 9.

Figure 9:
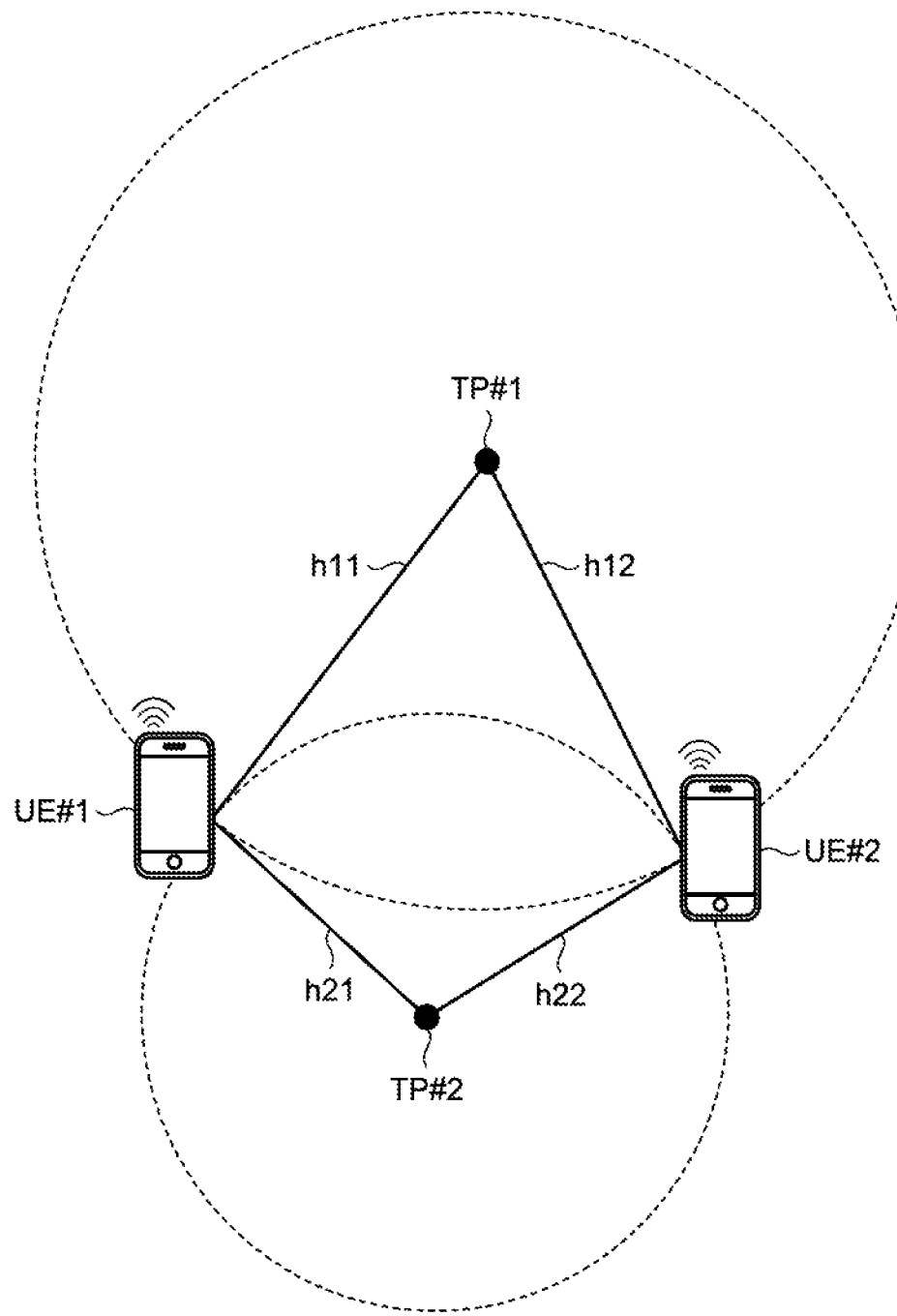
FIG. 9 is a schematic diagram illustrating the selection of UE according to a second embodiment.

As illustrated in FIG. 9, it is assumed that the transmitter station (TP#1) and the transmitter station (TP#2) are arranged in the radio communication system and these transmitter stations perform radio communication with the user terminal (UE#1) and the user terminal (UE#2). At this time, the metric of Equation (2) above is the sum of the differences between the propagation delay time from the single transmitter station 110 to each of the user terminals 120, such as the difference between the propagation delay time in the propagation paths h11 and h12 from the transmitter station (TP#1) to the user terminal (UE#1) and to the user terminal (UE#2).

Here, if the user terminal (UE#1) is set to the reference UE, the fact that the metric in Equation (2) above is small means as follows. Namely, the difference between the propagation delay time from the transmitter station (TP#1) to the reference UE and to the user terminal (UE#2) (in this case, corresponding to the difference between h11 and h12) is small and the difference between the propagation delay time from the transmitter station (TP#2) to the reference UE and to the user terminal (UE#2) (in this case, corresponding to the difference between h21 and h22) is small. Thus, if the user terminal (UE#2) having a small metric based on Equation (2) above is used, the propagation delay difference from each of the transmitter stations (in this case, corresponding to the difference between h12 and h22) is substantially the same as that related to the reference UE (in this case, corresponding to the difference between h11 and h21). Thus, in the second embodiment, the UE selecting unit 283 sequentially selects the predetermined number of the user terminals 120 in the order of the user terminals 120 that has a small metric in Equation (2).

In the following, the transmission control method according to the second embodiment will be described with reference to the flowchart illustrated in FIG. 10. In FIG. 10, the same processes as those illustrated in FIG. 7 are assigned the same reference numerals and descriptions thereof in detail will be omitted.

Similarly to the first embodiment, the reception timing corresponding to the propagation delay time between each of the user terminals 120 and the transmitter stations 110 from the reception data that is output from each of the transmitter stations 110 to the baseband processing unit 100 is detected and notified to the scheduler unit 280. Furthermore, because the reception data is demodulated by the reception processing unit 270, the channel state information on the downlink reported by the user terminal 120 is acquired and output to the scheduler unit 280.

Then, because the channel state information is used by the reference UE selecting unit 281 in the scheduler unit 280, the reference UE is selected (Step S101). If the reference UE is selected, the metric that is based on the reception timing related to each of the user terminals 120 and the reception timing related to the reference UE is calculated by the metric calculating unit 282 based on each of the transmitter stations 110 (Step S201). Namely, the metric that is used to determine, for each of the user terminals 120, whether the propagation delay time from each of the transmitter stations 110 is substantially the same as that of the reference UE and whether the propagation delay differences from the plurality of the transmitter stations 110 are similar to that of the reference UE is calculated.

Specifically, by using the reception timing detected by the channel estimation unit 260, the metric in Equation (2) above is calculated for each of the user terminals 120. If the metric is calculated for the single user terminal 120, it is determined, by the metric calculating unit 282, whether calculation of the metric has been completed for all of the user terminals 120 (Step S103). If the result of this determination indicates that the user terminal 120 in which the metric has not been calculated is present (No at Step S103), the calculation of the metric is repeated.

If the calculation of the metric has been completed for all of the user terminals 120 (Yes at Step S103), the predetermined number of the user terminals 120 are selected by the UE selecting unit 283 in the order in which the metric is small (Step S104). Regarding each of the user terminals 120, because the metric calculated by Equation (2) becomes smaller as the propagation delay difference is more similar to the reference UE, by selecting the user terminal 120 having a small metric, the user terminal 120 in which a propagation delay difference is similar to that of the reference UE is selected.

Then, an instruction to create the user data and the control data addressed to the selected user terminal 120 and the reference UE is output from the UE selecting unit 283 to the user data creating units 210-1 to 210-M and the control data creating unit 230 (Step S105). Furthermore, an instruction to create the beam with a large gain in the direction of the combination of the user terminals 120 that are selected by the UE selecting unit 283 is output from the beam decision unit 284 to the weight multiplication unit 220 (Step S106). Furthermore, an instruction to adjust the transmission timing from each of the transmitter stations 110 is output from the transmission timing decision unit 285 to the transmission timing control units 250-1 to 250-N (Step S107). In response to this instruction, the transmission timing of the transmission data that has been subjected to the transmission process is controlled by the transmission timing control units 250-1 to 250-N and is output to each of the transmitter stations 110.

The transmission data output in this way is wirelessly transmitted at the adjusted transmission timing from each of the transmitter stations 110 and is received by each of the user terminals 120. At this time, because the transmission timing for each of the transmitter stations 110 is adjusted, in each of the user terminals 120, the pieces of the transmission data from the plurality of the transmitter stations 110 are almost simultaneously received.

Furthermore, in the embodiment, the pieces of the user data that are addressed to the user terminals 120 and whose propagation delay differences are similar are also simultaneously transmitted from each of the transmitter stations 110. However, in the embodiment, because the user terminals 120 having the similar propagation delay differences are simultaneously selected as the transmission destination, the interference due to the user data addressed to the other user terminals 120 is sufficiently reduced by the phase adjustment due to the transmission weight. Namely, because the user terminals 120 having the similar propagation delay differences are simultaneously selected as the transmission destination, by adjusting the transmission timing in accordance with the similar propagation delay differences, it is possible to commonly decrease the actual propagation delay difference in each of the user terminals 120. Consequently, the variation in reception phase differences in the frequency domain due to the propagation delay differences is small and, even if a common transmission weight is multiplied to a portion of relatively wide band, such as the whole band of, for example, the user data, the interference due to the user data addressed to the other user terminals 120 is sufficiently reduced.

As described above, according to the embodiment, the combinations of the user terminals having similar propagation delay differences are selected by using the metric focusing on a difference between the propagation delay time from the same transmitter station to each of the user terminals. Then, regarding the selected combinations of the user terminals, the signals are allowed to be transmitted from the plurality of the transmitter stations after adjusting the transmission timing. Thus, by adjusting the transmission timing, it is possible to commonly reduce the actual propagation delay differences in all of the selected user terminals and it is possible to reduce the variation in the reception phase differences in the frequency domain due to the propagation delay differences. Consequently, the interference between the user terminals can be reduced even if a transmission weight is created at low frequency resolution and it is possible to efficiently reduce the interference by suppressing an increase in the processing amount.

Furthermore, in the first and the second embodiments, it is also possible to use a metric other than that represented by Equations (1) and (2). For example, instead of Equation (1), the metric represented by Equation (3) may also be used.

$$\text{Metric }(k) = \sum_n |(T(n, k) - T(l, k)) - (T(n, l) - T(l, l))|^a \quad (3)$$

In Equation (3), a is a predetermined integer and the metric of Metric(k) of the user terminal (UE#k) is set by exponentiating the absolute value of the difference between the propagation delay differences. By performing exponentiation in this way, it is possible to emphasize the influence of an increase in propagation delay differences between the transmitter stations 110.

[c] Third Embodiment

The characteristic of a third embodiment is that a metric and a predetermined threshold are compared and the combinations of the user terminals with the metric that satisfy a predetermined standard are selected.

The configuration of a radio communication system according to the third embodiment is the same as that described in the first embodiment (FIG. 1), therefore, descriptions thereof will be omitted. Furthermore, The configuration of the baseband processing unit 100 according to the third embodiment is the same as that described in the first embodiment (FIG. 2); therefore, descriptions thereof will be omitted. In the third embodiment, the standard of selecting the user terminals 120 performed by the UE selecting unit 283 in the scheduler unit 280 is different from that described in the first embodiment.

In the third embodiment, the UE selecting unit 283 compares the metric calculated by the metric calculating unit 282 with a predetermined threshold and extracts the user terminals 120 in each of which the metric is less than a predetermined threshold. Then, the UE selecting unit 283 selects, from the extracted user terminals 120, a predetermined number of the user terminals 120 in the order in which the metric is small.

In the following, the transmission control method according to the third embodiment will be described with reference to the flowchart illustrated in FIG. 11. In FIG. 11, the same processes as those illustrated in FIG. 7 are assigned the same reference numerals and descriptions thereof in detail will be omitted.

Similarly to the first embodiment, the reception timing corresponding to the propagation delay time between each of the user terminals 120 and the transmitter stations 110 from the reception data that is output from each of the transmitter stations 110 to the baseband processing unit 100 is detected and notified to the scheduler unit 280. Furthermore, because the reception data is demodulated by the reception processing unit 270, the channel state information on the downlink reported by the user terminal 120 is acquired and output to the scheduler unit 280.

Then, because the channel state information is used by the reference UE selecting unit 281 in the scheduler unit 280, the reference UE is selected (Step S101). If the reference UE is selected, the metric that is based on the propagation delay difference from the plurality of the transmitter stations 110 in each of the user terminals 120 and based on the propagation delay difference from the plurality of the transmitter stations 110 in the reference UE are calculated by the metric calculating unit 282 (Step S102). If the metric calculated for the single user terminal 120, it is determined, by the metric calculating unit 282, whether calculation of the metric has been completed for all of the user terminals 120 (Step S103). If the result of this determination indicates that the user terminal 120 in which the metric has not been calculated is present (No at Step S103), the calculation of the metric is repeated.

If the calculation of the metric has been completed for all of the user terminals 120 (Yes at Step S103), the metric of each of the user terminals 120 is compared with the predetermined threshold by the UE selecting unit 283 and the user terminal 120 in which the metric is less than the predetermined threshold is extracted (Step S301). Then, the predetermined number of the user terminals 120 are sequentially selected from among the extracted user terminals 120 in the order in which the metric is small (Step S104). In this way, by comparing the metric with the predetermined threshold and by setting an absolute reference to the metric of the selected user terminals 120, it is possible to reliably select the user terminals 120 having the propagation delay difference similar to that of the reference UE.

Then, an instruction to create the user data and the control data addressed to the selected user terminals 120 and the reference UE is output from the UE selecting unit 283 to the user data creating units 210-1 to 210-M and the control data creating unit 230 (Step S105). Furthermore, an instruction to create the beam with a large gain in the direction of the combination of the user terminals 120 that are selected by the UE selecting unit 283 is output from the beam decision unit 284 to the weight multiplication unit 220 (Step S106). Furthermore, an instruction to adjust the transmission timing from each of the transmitter stations 110 is output from the transmission timing decision unit 285 to the transmission timing control units 250-1 to 250-N (Step S107). In response to this instruction, the transmission timing of the transmission data that has been subjected to the transmission process is controlled by the transmission timing control units 250-1 to 250-N and is output to each of the transmitter stations 110.

As described above, according to the embodiment, by comparing the metric with the predetermined threshold, the user terminal associated with the metric that satisfies the standard is extracted and then the combinations of the user terminals that simultaneously become the transmission destination are selected from the extracted user terminals. Consequently, it is possible to reliably select the combinations of the user terminals having the similar propagation delay differences and it is possible to reduce, by commonly reducing the actual propagation delay differences of the propagation from each of the transmitter stations, the variation in the reception phase differences in the frequency domain due to the propagation delay differences. Consequently, the interference between the user terminals can be reduced even if a transmission weight is created at low frequency resolution and it is possible to efficiently reduce the interference by suppressing an increase in the processing amount.

[d] Fourth Embodiment

The characteristic of a fourth embodiment is that the number of user terminals having the metric that satisfies a predetermined standard is calculated and the calculation of the metric is stopped when the number of counts reaches a predetermined number.

The configuration of a radio communication system according to the fourth embodiment is the same as that described in the first embodiment (FIG. 1), therefore, descriptions thereof will be omitted. Furthermore, The configuration of the baseband processing unit 100 according to the fourth embodiment is the same as that described in the first embodiment (FIG. 2); therefore, descriptions thereof will be omitted. In the fourth embodiment, the condition in which the metric calculating unit 282 in the scheduler unit 280 repeats the calculation of the metric is different from that described in the first embodiment.

In the fourth embodiment, the metric calculating unit 282 calculates, for each of the user terminals 120, the metric described in, for example, the first embodiment and the second embodiment and counts the number of the user terminals 120 in which the metric is less than a predetermined threshold. Then, if the number of counted user terminals reaches the predetermined number, the metric calculating unit 282 stops the calculation of the metric at that time and then instructs the UE selecting unit 283 to select the counted user terminals.

In the following, the transmission control method according to the fourth embodiment will be described with reference to the flowchart illustrated in FIG. 12. In FIG. 12, the same processes as those illustrated in FIG. 7 are assigned the same reference numerals and descriptions thereof in detail will be omitted.

Similarly to the first embodiment, the reception timing corresponding to the propagation delay time between each of the user terminals 120 and the transmitter stations 110 from the reception data that is output from each of the transmitter stations 110 to the baseband processing unit 100 is detected and notified to the scheduler unit 280. Furthermore, because the reception data is demodulated by the reception processing unit 270, the channel state information on the downlink reported by the user terminal 120 is acquired and output to the scheduler unit 280.

Then, because the channel state information is used by the reference UE selecting unit 281 in the scheduler unit 280, the reference UE is selected (Step S101). If the reference UE is selected, the metric that is based on the propagation delay difference in each of the user terminals 120 from the plurality of the transmitter stations 110 and that is based on the propagation delay difference in the reference UE from the plurality of the transmitter stations 110 are calculated by the metric calculating unit 282 (Step S102). If the metric is calculated for the single user terminal 120, the metric related to the subject user terminal 120 is compared with the predetermined threshold and then the number of the user terminals 120 in which the metric is less than the predetermined threshold is counted (Step S401).

Namely, in the fourth embodiment, every time the metric is calculated for the user terminals 120, it is determined whether the metric is less than the predetermined threshold and the number of user terminals 120 in which the metric is less than the predetermined threshold and the propagation delay difference is similar to that of the reference UE is counted. Then, it is determined, by the metric calculating unit 282, whether the number of the counted user terminal 120 reaches the predetermined number (Step S402). If the result of this determination indicates that the number of user terminals with the metric that is less than the predetermined threshold does not reach the predetermined number (No at Step S402), the calculation of the metric is repeated.

In contrast, if the number of user terminals with the metric that is less than the predetermined threshold reaches the predetermined number (Yes at Step S402), the user terminals 120 with the metric that is less than the predetermined threshold are notified to the UE selecting unit 283 and the notified user terminals 120 are selected by the UE selecting unit 283. In this way, when the number of user terminals with the metric less than the predetermined threshold reaches the predetermined number, these user terminals 120 are selected. Thus, the metric is not calculated for all of the user terminals 120, it is possible to reduce an amount of process of calculating the metric, and it is possible to select the user terminals 120 having the propagation delay difference similar to that of the reference UE in a short time.

Then, an instruction to create the user data and the control data addressed to the selected user terminals 120 and the reference UE is output from the UE selecting unit 283 to the user data creating units 210-1 to 210-M and the control data creating unit 230 (Step S105). Furthermore, an instruction to create the beam with a large gain in the direction of the combinations of the user terminals 120 that are selected by the UE selecting unit 283 is output from the beam decision unit 284 to the weight multiplication unit 220 (Step S106). Furthermore, an instruction to adjust the transmission timing from each of the transmitter stations 110 is output from the transmission timing decision unit 285 to the transmission timing control units 250-1 to 250-N (Step S107). In response to this instruction, the transmission timing of the transmission data that has been subjected to the transmission process is controlled by the transmission timing control units 250-1 to 250-N and is output to each of the transmitter stations 110.

As described above, according to the embodiment, the metric is calculated for each user terminal, the calculation of the metric is stopped when the number of user terminals with the metric that is less than the predetermined threshold reaches the predetermined number, and the combinations of the user terminals that simultaneously become the transmission destination are selected. Thus, it is possible to promptly select the combinations of the user terminals having similar propagation delay differences and thus reducing an amount of process related to the calculation of the metric.

[e] Fifth Embodiment

The characteristic of a fifth embodiment is that the predetermined number of user terminals is selected based on the metric and then the combinations of the user terminals that simultaneously become the transmission destination are decided such that the throughput is increased.

The configuration of a radio communication system according to the fifth embodiment is the same as that described in the first embodiment (FIG. 1), therefore, descriptions thereof will be omitted. Furthermore, The configuration of the baseband processing unit 100 according to the fifth embodiment is the same as that described in the first embodiment (FIG. 2); therefore, descriptions thereof will be omitted. In the fifth embodiment, the standard in which the UE selecting unit 283 in the scheduler unit 280 selects the user terminals 120 is different from that described in the first embodiment.

In the fifth embodiment, the UE selecting unit 283 sequentially selects the predetermined number of the user terminals 120 from among the user terminals 120 in the order in which the metric calculated by the metric calculating unit 282 is small. Then, the UE selecting unit 283 decides, from among the selected combinations of the user terminals 120, the combination in which the expected throughput is the highest. Namely, regarding each of the combinations of the desired number of the user terminals 120 from among the combinations of the user terminals 120 selected based on the metric, the UE selecting unit 283 calculates the throughput in a case where the user terminals 120 are simultaneously used as the transmission destination. Then, the UE selecting unit 283 decides the combination of the user terminals 120 in which the expected throughput is the highest and decides to simultaneously transmit the user data to this combination.

In the following, the transmission control method according to the fifth embodiment will be described with reference to the flowchart illustrated in FIG. 13. In FIG. 13, the same processes as those illustrated in FIG. 7 are assigned the same reference numerals and descriptions thereof in detail will be omitted.

Similarly to the first embodiment, the reception timing corresponding to the propagation delay time between each of the user terminals 120 and the transmitter stations 110 from the reception data that is output from each of the transmitter stations 110 to the baseband processing unit 100 is detected and notified to the scheduler unit 280. Furthermore, because the reception data is demodulated by the reception processing unit 270, the channel state information on the downlink reported by the user terminal 120 is acquired and output to the scheduler unit 280.

Then, because the channel state information is used by the reference UE selecting unit 281 in the scheduler unit 280, the reference UE is selected (Step S101). If the reference UE is selected, the metric that is based on the propagation delay difference in each of the user terminals 120 from the plurality of the transmitter stations 110 and that is based on the propagation delay difference in the reference UE from the plurality of the transmitter stations 110 are calculated by the metric calculating unit 282 (Step S102). If the metric calculated for the single user terminal 120, it is determined, by the metric calculating unit 282, whether calculation of the metric has been completed for all of the user terminals 120 (Step S103). If the result of this determination indicates that the user terminal 120 in which the metric has not been calculated is present (No at Step S103), the calculation of the metric is repeated.

If the calculation of the metric has been completed for all of the user terminals 120 (Yes at Step S103), the predetermined number of the user terminals 120 is selected by the UE selecting unit 283 in the order in which the metric is small (Step S104). Furthermore, regarding each of the selected combinations of the user terminals 120, the expected throughput in a case where user terminals 120 are simultaneously used as the transmission destination of the user data is calculated by the UE selecting unit 283 and the combination with the highest throughput is decided (Step S501). In this way, because the combination of the user terminals 120 is decided based on the throughput, it is possible to reduce interference and, at the same time, it is possible to improve the throughput.

Then, an instruction to create the user data and the control data addressed to the decided combinations of the user terminals 120 and the reference UE is output from the UE selecting unit 283 to the user data creating units 210-1 to 210-M and the control data creating unit 230 (Step S105). Furthermore, an instruction to create the beam with a large gain in the direction of the combinations of the user terminals 120 that are decided by the UE selecting unit 283 is output from the beam decision unit 284 to the weight multiplication unit 220 (Step S106). Furthermore, an instruction to adjust the transmission timing from each of the transmitter stations 110 is output from the transmission timing decision unit 285 to the transmission timing control units 250-1 to 250-N (Step S107). In response to this instruction, the transmission timing of the transmission data that has been subjected to the transmission process is controlled by the transmission timing control units 250-1 to 250-N and is output to each of the transmitter stations 110.

As described above, according to the embodiment, the combinations that allow the expected throughput to be highest from among the combinations of the user terminals that are selected based on the metric is decided. Thus, it is possible to reduce the interference and, at the same time, it is possible to improve the throughput.

Furthermore, the baseband processing unit 100, the transmitter station 110, and the user terminal 120 according to the first to the fifth embodiments have the hardware configuration illustrated in, for example, FIG. 14.

The baseband processing unit 100 includes a network interface (NIF) circuit 101, a processor 102, a memory 103, and a transmission reception circuit 104. The NIF circuit 101 is an interface circuit that is connected to a higher-level device, such as a gateway device of, for example, the basic network, or the like.

The processor 102 includes, for example, a central processing unit (CPU), a Field Programmable Gate Array (FPGA), Digital Signal Processor (DSP), or the like and executes various processes by using the memory 103. The processor 102 corresponds to the processing unit, such as the user data creating units 210-1 to 210-M, the weight multiplication unit 220, the control data creating unit 230, the scheduler unit 280, or the like, illustrated in, for example, FIG. 2.

The memory 103 includes, for example, a RAM (Random Access Memory) or a Read Only Memory (ROM), or the like and stores therein various kinds of information that are used for the process performed by the processor 102.

The transmission reception circuit 104 is an interface circuit that is connected to the transmitter stations 110 via, for example, optical fibers and sends and receives a baseband signal to and from the transmitter stations 110. The transmission reception circuit 104 corresponds to the processing unit, such as the transmission processing units 240-1 to 240-N, the transmission timing control units 250-1 to 250-N, the channel estimation unit 260, the reception processing unit 270, and the like, illustrated in FIG. 2.

The transmitter station 110 includes a transmission reception circuit 111 and a radio process circuit 112. The transmission reception circuit 111 is an interface circuit connected to the baseband processing unit 100 via, for example, optical fibers and sends and receives a baseband signal to and from the baseband processing unit 100.

The radio process circuit 112 performs a radio transmission process, such as D/A conversion, up-conversion, or the like, on the baseband signal received by the transmission reception circuit 111 and sends the processed signal to the user terminal 120 via the antenna. Furthermore, the radio process circuit 112 performs the radio reception process, such as down-conversion, A/D conversion, or the like, on the reception signal received from the user terminal 120 via the antenna and outputs the processed signal to the transmission reception circuit 111.

The user terminal 120 includes a radio process circuit 121, a processor 122, and a memory 123. The radio process circuit 121 performs the radio reception process, such as down-conversion, A/D conversion, or the like, on the reception signal received from the transmitter station 110 via the antenna and outputs the processed signal to the processor 122. Furthermore, the radio process circuit 121 performs the radio transmission process, such as D/A conversion, up-conversion, or the like, on the baseband signal generated by the processor 122 and sends the processed signal to the transmitter station 110 via the antenna.

The processor 122 includes, for example, a CPU, an FPGA, or a DSP and performs various processes by using the memory 123. Namely, for example, the processor 122 demodulates or decodes the reception signal received by the radio process circuit 121 or generates a baseband signal including uplink transmission data.

The memory 123 includes, for example, a RAM, a ROM, or the like and stores therein various kinds of information used for the process performed by the processor 122.

Furthermore, the hardware configuration illustrated in FIG. 14 is only an example and the baseband processing unit 100, the transmitter station 110, and the user terminal 120 may also have another physical configuration. For example, the transmitter station 110 may also have a processor in addition to the transmission reception circuit 111, and the radio process circuit 112 and the processor may also perform distortion compensation by using a predistortion method. Furthermore, FIG. 14 illustrates the baseband processing unit 100 and the transmitter station 110 as individual units; however, it may also possible to integrally configure the baseband processing unit 100 and the transmitter station 110 as a base station device. In such a base station device, it may also possible to perform the same transmission control method as that used in the embodiments described above.

According to an aspect of an embodiment of the transmission control device and the transmission control method described in the present invention, an advantage is provided in that, when signals are transmitted from a plurality of transmitter stations to a plurality of user terminals, interference can be efficiently reduced by suppressing an increase in an amount of process.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control device comprising:
an acquiring unit that acquires propagation delay time for each propagation path between a plurality of terminal devices and a plurality of transmitter stations;
a selector that selects, based on the propagation delay time acquired by the acquiring unit, combinations of terminal devices having similar propagation delay differences from the plurality of the transmitter stations; and
a controller that controls transmission timing of the plurality of the transmitter stations that transmit signals to the combinations of the terminal devices selected by the selector, wherein
the selector includes
a reference terminal selector that selects a single reference terminal device from among the plurality of the terminal devices,
a metric calculator that calculates, for each of the terminal devices, a metric associated with a difference between a propagation delay difference from two transmitter stations about the reference terminal device selected by the reference terminal selector and a propagation delay difference from the two transmitter stations about each of the other terminal devices, and
a terminal selector that selects, based on the metric calculated by the metric calculator, the terminal device that has a propagation delay difference similar to a propagation delay difference of the reference terminal device.

2. The transmission control device according to claim 1, wherein the terminal selector selects a predetermined number of the terminal devices in order in which the calculated metric is small.

3. The transmission control device according to claim 1, wherein the terminal selector selects the terminal device in which the calculated metric is less than a predetermined threshold.

4. The transmission control device according to claim 1, wherein
the metric calculator counts a number of terminal devices in each of which the calculated metric is less than a predetermined threshold and stops calculating the metric when the number of counted terminal devices reaches a predetermined number, and
the terminal selector selects the terminal devices counted by the metric calculator.

5. A transmission control device comprising:
an acquiring unit that acquires propagation delay time for each propagation path between a plurality of terminal devices and a plurality of transmitter stations;
a selector that selects, based on the propagation delay time acquired by the acquiring unit, combinations of terminal devices having similar propagation delay differences from the plurality of the transmitter stations; and
a controller that controls transmission timing of the plurality of the transmitter stations that transmit signals to the combinations of the terminal devices selected by the selector, wherein
the selector includes
a reference terminal selector that selects a single reference terminal device from among the plurality of the terminal devices,
a metric calculator that calculates, for each of the terminal devices, a metric associated with a difference between propagation delay time between the reference terminal device selected by the reference terminal selector and a single transmitter station and propagation delay time between each of the other terminal devices and the single transmitter station, and
a terminal selector that selects, based on the metric calculated by the metric calculator, the terminal device that has a propagation delay difference similar to a propagation delay difference of the reference terminal device.

6. The transmission control device according to claim 5, wherein the terminal selector selects a predetermined number of the terminal devices in order in which the calculated metric is small.

7. The transmission control device according to claim 5, wherein the terminal selector selects the terminal device in which the calculated metric is less than a predetermined threshold.

8. The transmission control device according to claim 5, wherein the metric calculator counts a number of terminal devices in each of which the calculated metric is less than a predetermined threshold and stops calculating the metric when the number of counted terminal devices reaches a predetermined number, and
the terminal selector selects the terminal devices counted by the metric calculator.

9. A transmission control method comprising:
acquiring propagation delay time for each propagation path between a plurality of terminal devices and a plurality of transmitter stations;
selecting, based on the acquired propagation delay time, combinations of terminal devices having similar propagation delay differences from the plurality of the transmitter station; and
controlling transmission timing of the plurality of the transmitter stations that transmit signals to the combinations of the selected terminal devices, wherein
the selecting includes
  selecting a single reference terminal device from among the plurality of the terminal devices,
  calculating, for each of the terminal devices, a metric associated with a difference between a propagation delay difference from two transmitter stations about the reference terminal device selected and a propagation delay difference from the two transmitter stations about each of the other terminal devices, and
  selecting, based on the calculated metric, the terminal device that has a propagation delay difference similar to a propagation delay difference of the reference terminal device.

* * * * *